(12) United States Patent
Corbe et al.

(10) Patent No.: US 12,085,437 B2
(45) Date of Patent: Sep. 10, 2024

(54) LEVEL METER FOR LEVEL LIMIT DETERMINATION AND FOR MEASURING AN IMPEDANCE OF A FILLING MATERIAL

(71) Applicant: VEGA Grieshaber KG, Wolfach (DE)

(72) Inventors: Bernhard Corbe, Schutterwald (DE); Benjamin Schaetzle, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 240 days.

(21) Appl. No.: 17/816,801

(22) Filed: Aug. 2, 2022

(65) Prior Publication Data

US 2023/0175880 A1 Jun. 8, 2023

(30) Foreign Application Priority Data

Aug. 3, 2021 (DE) .................... 10 2021 120 175.6

(51) Int. Cl.
| | | |
|---|---|---|
| *G01F 23/26* | (2022.01) | |
| *G01F 23/24* | (2006.01) | |
| *G01F 23/263* | (2022.01) | |
| *G01F 25/20* | (2022.01) | |

(52) U.S. Cl.
CPC .......... *G01F 23/241* (2013.01); *G01F 23/266* (2013.01); *G01F 25/24* (2022.01)

(58) Field of Classification Search
CPC .......... G01F 23/28; G01F 25/00; G01F 25/20; G01F 25/24
See application file for complete search history.

(56) References Cited

U.S. PATENT DOCUMENTS

| | | | |
|---|---|---|---|
| 6,970,738 B1* | 11/2005 | Othman | .................. A61B 5/053 600/547 |
| 10,416,020 B2 | 9/2019 | Wernet et al. | |
| 10,422,680 B2 | 9/2019 | Wernet et al. | |
| 2010/0295565 A1 | 11/2010 | Drack | |
| 2020/0158554 A1* | 5/2020 | Wernet | .................... G01F 23/26 |

FOREIGN PATENT DOCUMENTS

| | | |
|---|---|---|
| CN | 101358868 A | 2/2009 |
| DE | 102014113545 A1 | 3/2016 |
| DE | 102016214387 A1 | 2/2017 |

(Continued)

*Primary Examiner* — Herbert K Roberts
(74) *Attorney, Agent, or Firm* — Sterne, Kessler, Goldstein & Fox P.L.L.C.

(57) ABSTRACT

A level measuring device for level and/or limit determination and for measuring an impedance of a filling material is provided. The level measuring device comprises a measuring probe, arranged for measuring the impedance of the filling material. Further comprising a signal generation unit, arranged for generating a first frequency signal with variable frequency, wherein the measuring probe is supplied with the first frequency signal and outputs a measuring signal. Further, a measurement converter arranged to convert the measurement signal into a mixed signal, wherein the mixed signal has a phase difference with respect to the first frequency signal. Furthermore, the level measuring device comprises a phase difference measuring unit, which is arranged to determine an amplitude-phase characteristic of the filling material measured by the measuring probe, by means of the phase and amplitude difference between the first frequency signal and the mixed signal.

13 Claims, 5 Drawing Sheets

(56) References Cited

FOREIGN PATENT DOCUMENTS

| DE | 102017111393 | A1 |   | 11/2018 |            |
|----|--------------|----|---|---------|------------|
| DE | 102018209904 | A1 | * | 12/2019 | G01F 23/0007 |
| DE | 102020200879 | A1 |   | 7/2021  |            |
| EP | 3152530      | A1 |   | 4/2017  |            |
| EP | 2994725      | B1 |   | 1/2020  |            |
| EP | 3186597      | B1 |   | 3/2021  |            |
| JP | 09166477     | A  | * | 6/1997  |            |
| JP | H 09166477   | A  |   | 6/1997  |            |

* cited by examiner

LEVEL METER FOR LEVEL LIMIT DETERMINATION AND FOR MEASURING AN IMPEDANCE OF A FILLING MATERIAL

CROSS-REFERENCE TO RELATED APPLICATION

This application claims priority to German Patent Application No. 10 2021 120 175.6, filed on Aug. 3, 2021, the entire content of which is incorporated herein by reference.

TECHNICAL FIELD

The disclosure relates to a level measuring device, in particular for level limit determination and for measuring an impedance of a filling material. Furthermore, the disclosure relates to a measuring probe, a method, and an application.

BACKGROUND

In process and factory automation, electronic sensors are used to monitor and control processes. Such sensors can, for example, be suitable or configured for detecting fill levels, limit levels of media, and/or for monitoring other process parameters. For at least some applications in process and factory automation, it can be useful to be able to determine further properties of the medium in addition to a fill level and/or limit level.

SUMMARY

It may be an object of the disclosure to provide a level measuring device, which can determine a level or limit level and other properties of the medium.

This may be achieved by the subject-matter of the independent patent claims. Further embodiments of the disclosure result from the dependent claims and the following description.

One aspect relates to a level measuring device for level and/or limit level determination and for measuring an impedance of a filling material in a container, comprising:
  a measuring probe, configured to measure the impedance of the medium;
  a signal generation unit, arranged for generating a first frequency signal with variable frequency, wherein the measuring probe is supplied with the first frequency signal and outputs a measuring signal;
  a measurement converter arranged to convert the measurement signal into a mixed signal, the mixed signal having a phase difference with respect to the first frequency signal; and
  a phase difference measuring unit arranged to determine an amplitude-phase characteristic of the filling material measured by the measuring probe on the basis of the variable frequency of the first frequency signal, for example by means of the phase and amplitude difference between the first frequency signal and the mixed signal.

The medium or filling material can be, for example, a liquid, including an emulsion or suspension, or a bulk material, in particular a granular or powder shaped bulk material. The medium or fill material can be, for example, a liquid, including water, juice, milk, alcohols, oils, paint, ketchup, or a bulk material such as flour, sand, coffee powder, plastic granules, and/or other goods. The medium may be contained in a container. The container may be, for example, a vessel or a measuring tank, process tank, storage tank, or silo of any shape. The container may also be a channel, for example a stream or river bed.

Various types of measuring devices are used for level measurement or level limit determination, e.g. in a tank, for example an impedance limit switch. The impedance level switch can have two or more electrodes. Many such measuring devices evaluate only one conductivity, i.e. an ohmic resistance of the medium or filling material. The impedance limit switch described here is configured to detect and evaluate both the real part (ohmic resistance) and the imaginary part (capacitive or inductive reactance) of the impedance of the medium, material, or filling material (also referred to herein as product). Advantageously, a permittivity, e.g. a relative permittivity, of the medium can be detected.

The measuring probe is configured to measure or detect the impedance of the medium. The measuring probe is supplied with the first frequency signal from the signal generation unit and outputs a measuring signal. It has been found to be advantageous for detection and evaluation if the first frequency signal has a frequency that varies over the duration of the measurement. For further evaluation, the measurement signal is fed to a measurement converter, which converts the measurement signal into a mixed signal. After conversion, the mixed signal has a phase difference compared to the first frequency signal. The phase difference measuring unit can use the phase and amplitude difference between the first frequency signal and the mixed signal to determine an amplitude-phase curve of the filling material measured by the measuring probe based on the variable frequency of the first frequency signal.

With the level meter, not only the coverage of the sensor with the medium can be measured by means of a single sensor, but also a separation of the medium properties, such as conductivity or relative permittivity, can be achieved. It is also advantageous that the coverage of the sensor with the medium can be distinguished more clearly from a non-covered state. This can be particularly advantageous, for example, when measuring viscous products or filling materials—such as skin cream, ketchup, honey and the like—where buildup can often remain on the probe in the uncovered state, so that the buildup can impair the unambiguousness of a determination of the uncovered state. In the case of the devices or measurement methods described, the evaluation can be performed, for example, by measuring the impedance with different frequencies and/or waveforms. A more accurate separation of these parameters can be achieved by measurements over a wider frequency range, e.g. of more than 100 kHz, and in particular by measuring the phase position in addition to the magnitude.

In some embodiments, the transducer comprises a signal generation unit further arranged to generate a second frequency signal having a variable frequency. Thereby, the second frequency signal has a constant frequency difference to the first frequency signal. Further, the transducer comprises a reference mixer unit and a receive mixer unit. The reference mixing unit is arranged for mixing the first frequency signal with the second frequency signal to generate a first reference signal. The receive mixer unit is arranged for mixing the second frequency signal with an output of a measuring bridge to generate the mixed signal. In this case, the measuring bridge is connected to the measuring probe. By implementing the measuring bridge, a particularly accurate measurement of the impedance of the medium can advantageously be achieved, whereby the measuring probe can further advantageously only be supplied with a very low current.

In an embodiment, the reference mixer unit and/or the receive mixer unit is designed as a double balanced mixer. The double balanced mixer can provide for the suppression of noise from the amplitude noise of the input signals and can additionally have or provide a good isolation between the inputs.

In an embodiment, the reference mixer unit and/or the receive mixer unit is designed as a quadrature demodulator. In this way, requirements or demands on the analog-to-digital converter can be kept low In some embodiments, the transducer has a transimpedance amplifier that is configured to connect the measuring probe and output the mixed signal. This realization advantageously has only a few components. This can contribute to a particularly robust and/or low-cost design of the measuring transducer.

In some embodiments, the first frequency signal and the optional second frequency signal have a continuously varying frequency, for example continuously varying up and/or down (or to higher frequencies and/or lower frequencies). The frequency may be continuously variable to higher frequencies and/or to lower frequencies. The frequency generator can be implemented, for example, by means of a VCO (voltage-controlled oscillator).

In some embodiments, the first frequency signal and the optional second frequency signal have a stepwise variable frequency, for example, the first and/or second frequency signal may be a sinusoidal signal with defined, section-wise fixed frequencies within a defined frequency band. In this case, the frequency remains at a certain frequency for a predefined period of time and then "jumps" to the next higher or—depending on the implementation—lower frequency. The first and/or second frequency signal may be implemented as a sinusoidal signal with defined, section-wise fixed frequencies within a defined frequency band. In such an embodiment, the mixed signal 142 and the reference signal 132 can be very narrow band. This in turn may allow these signals to be filtered in a very narrow band, greatly reducing noise and increasing dynamic range.

In some embodiments, the level meter further comprises a first calibration unit, wherein the first calibration unit is connected in parallel to the measuring probe to a switching device, so that optionally an impedance of the first calibration unit is measured instead of the impedance of the medium measured by the measuring probe. The calibration unit can be formed by means of an equivalent circuit, which simulates a certain medium and/or another measuring situation—e.g. a short circuit.

In some embodiments, the calibration unit has at least one of the following calibration standards: a short-circuit standard (S), an open standard (O), and/or a load standard (L). The load standard may comprise one or more settings. The load standard may be formed, for example, by means of an equivalent circuit that replicates the electrical properties of one or more media.

In some embodiments, the first frequency signal and the second frequency signal have a frequency between 50 Hz and 500 kHz, for example between 5 kHz and 300 kHz. This frequency range has proven to be advantageous in various test series for obtaining particularly meaningful characteristics of properties of the medium.

In some embodiments, the first frequency signal and the second frequency signal have a constant frequency difference between 10 Hz and 50 kHz, for example between 1 kHz and 10 kHz. In many embodiments, the frequency difference may be about 20% to 30% of the frequency of the first and/or second frequency signal. This can contribute to a particularly clear representation of the phase difference.

In some embodiments, the level meter further comprises an evaluation unit configured to determine a type of the product or filling material. The evaluation unit may comprise, for example, an optical representation of the measured impedance pattern. The evaluation unit may comprise a pattern identifier that can determine properties of the measured medium from the measured impedance curve, e.g. type and/or composition of the medium.

One aspect relates to a measuring probe configured to be disposed in a filling material within a container. The measuring probe comprises a measuring electrode and a sheath electrode. Here, the measuring electrode is arranged at least partially within an outer contour of the sheath electrode, and the measuring probe is arranged for connection to a level measuring device as described above and/or below. The measuring probe has metal electrodes, e.g. made of copper, stainless steel and/or another conductive metal. The type of metal may depend on the medium to be measured. The measuring probe may be embedded in a non-conductive material, e.g. a plastic, which may e.g. increase the robustness of the measuring probe.

In some embodiments, the measuring probe further comprises a second calibration unit. In this case, the second calibration unit is connected in parallel to the measuring probe so that an impedance of the second calibration unit can optionally be measured by a level measuring device as described above and/or below instead of the impedance of the filling material measured by the measuring probe. The first calibration unit can be used alternatively or in addition to the second calibration unit. Similar to the first calibration unit, the second calibration unit may have a short-circuit standard (S), an open standard (O), and/or a load standard (L). The second calibration unit can be placed close to one of the measuring electrodes to advantageously minimize parasitic effects.

One aspect relates to a method for measuring an impedance of a filling material, comprising the steps of:
- arranging a measuring probe as described above and/or below in a filling material within a container;
- connecting a level meter to the measuring probe as described above and/or below;
- applying a first variable frequency signal to the probe; and
- determining an amplitude-phase curve of the filling material measured by the measuring probe, by means of a phase as well as amplitude difference based on the variable frequency of the first frequency signal.

One aspect relates to a use of a level meter as described above and/or below and/or a measuring probe as described above and/or below for level limit determination of a filling material, in particular for a more precise and/or more robust level limit determination, and for measuring an amplitude-phase response of the filling material in a container based on the variable frequency of the first frequency signal.

For further clarification, the disclosure is described with reference to embodiments illustrated in the figures. These embodiments are to be understood only as examples and not as limitations.

BRIEF DESCRIPTION OF THE FIGURES

Thereby shows.

DETAILED DESCRIPTION OF EMBODIMENTS

Figure 1:
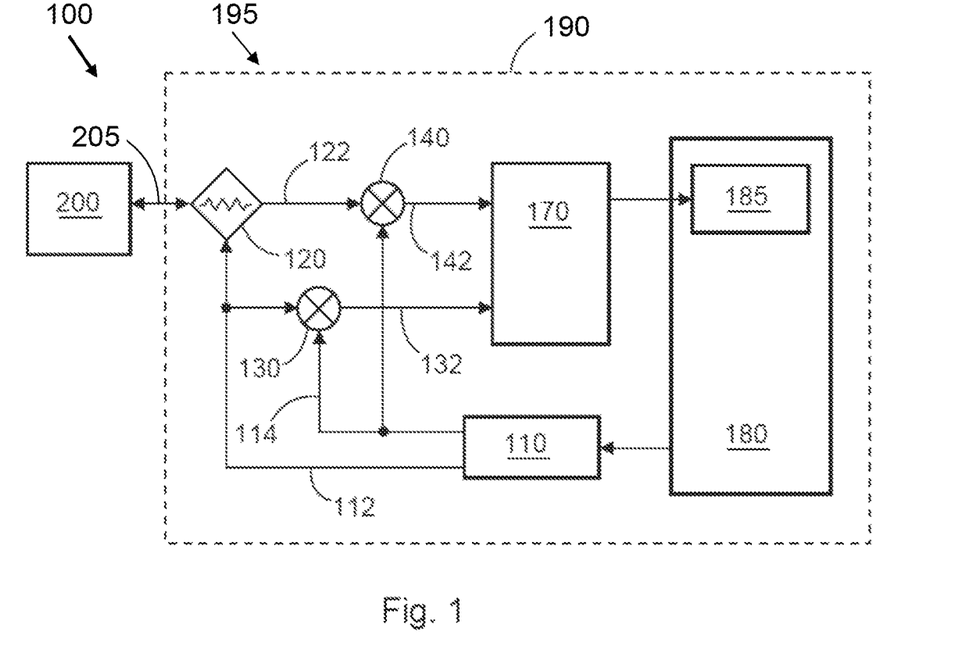
FIG. 1 schematically a level measuring device according to an embodiment.

FIG. 1 schematically shows a level measuring device 100 according to an embodiment. The level measuring device 100 comprises a measuring probe 200, which is arranged to measure an impedance of a filling material 20 (see, for example, FIG. 10); for this purpose, the measuring probe 200 may be arranged in a container. The level measurement device 100 further comprises a signal generation unit 110 configured to generate a first frequency signal 112. The signal generation unit 110 is controlled by a control and evaluation unit 180, which may comprise, for example, a microcontroller. An analog measurement signal, the first frequency signal 112, is generated via the signal generation unit 110. The signal generation unit 110 may consist of a controlled oscillator circuit, or may be implemented as a DDS (Direct Digital Synthesis). Special integrated circuits can be used to build a DDS, which include all the components required for this purpose. The first frequency signal 112 has a variable frequency. The measurement signal 112 is implemented, for example, as a sinusoidal signal with continuously variable frequency, or with defined, section-wise fixed (step-wise variable) frequencies within a defined frequency band, whereby the individual frequencies can be distributed over the band. The first frequency signal 112 is routed on the one hand to the reference mixer unit 130 and on the other hand to the measuring bridge 120.

The measuring probe 200 is supplied with the first frequency signal 112 and outputs a measuring signal 205, which is converted into a mixed signal 142 by means of a measuring converter 190. The mixed signal 142 can be implemented as an IF signal (IF: intermediate frequency), i.e., as a signal with a fixed base frequency, the base frequency of the IF signal having a lower frequency than the first or second frequency signal 112, 114. For this purpose, the measurement signal 205 is evaluated by means of a measuring bridge 120 and is passed to a receiver mixer unit 140. The measuring bridge 120 is designed in such a way that the measuring probe 200 acts as an impedance. The received signal 122 modified by the measuring bridge 120 and the impedance of the measuring probe 200 is present at the receive mixer unit 140. The receive mixer unit 140 mixes a second frequency signal or local oscillator signal 114 with an output 122 of the measuring bridge 120 to produce the mixed signal 142. The local oscillator signal 114 is slightly different in frequency from the measurement signal 112. For example, a second DDS IC, or alternatively a DDS IC with two outputs that can be controlled differently, can be used to generate the signal 114. The frequency difference between the two signals can remain constant throughout the entire measurement process. In this case, the mixed signal 142 has a phase difference with respect to the first frequency signal 112. The local oscillator signal 114 is present at both the reference mixer unit 130 and the receive mixer unit 140. In the shown embodiment, the level measuring device 100 comprises a reference mixer unit 130 that mixes the first frequency signal 112 with the second frequency signal 114 to generate a first reference signal 132; the first reference signal 132 has the phase difference with respect to the first frequency signal 112. The first reference signal 132 may also be implemented as an IF signal. The two mixer units 130 and 140 can be designed, for example, as double-balanced mixers based on the Gilbert cell principle.

Figure 7:
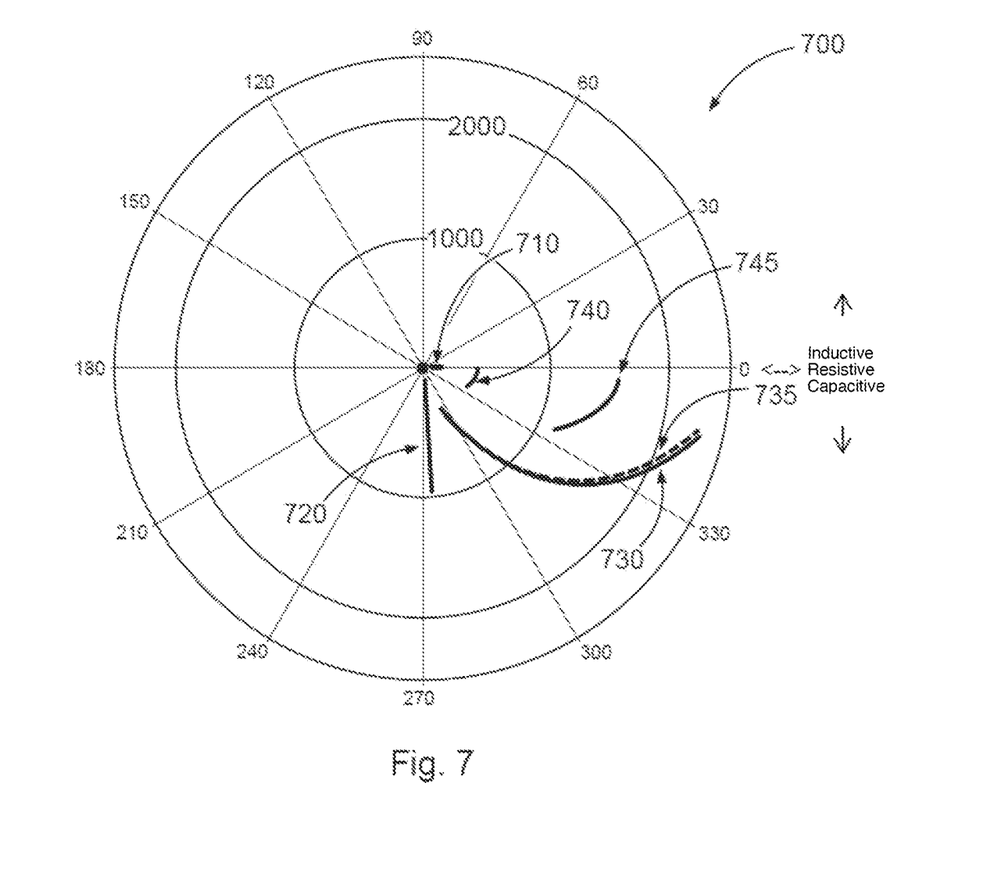
FIG. 7 a polar diagram with measurements and/or simulations according to an embodiment.

Mixing down the measurement signal 112 with the local oscillator signal 114 at the mixer unit 130 produces a signal 136, which serves as a reference signal. Similarly, mixing down the received signal 122 and the local oscillator signal 114 at the mixer unit 140 produces the intermediate frequency signal 146. The mixed-down signals 136 and 146 can then be digitized by a converter unit or phase difference measuring unit 170, which may consist of an analog-to-digital converter, for example. The converter unit 170 may be implemented as a separate module, or as part of the control and evaluation unit 180. The converter unit 170 may be arranged to determine an amplitude and phase that varies over the variable frequency 112, 114. The result of the transducer unit 170—and/or of downstream-units such as an evaluation unit and/or control unit 180 and/or a signal processing unit 185—may be a diagram, such as shown in FIG. 7. Using the change in magnitude and phase between the measurement signal 112 and the received signal 122, the impedance of the measurement probe can now be calculated. This can be performed in the signal processing unit 185, which can be a part of the evaluation and control unit 180. Since the magnitude and phase of the received signal 122 differ from the magnitude and phase of the measured signal 112 due to the impedance of the measuring electrode 200, it is useful to perform calibration with the measuring electrode 200 uncovered. This ensures that the uncovered condition can be used as a new reference value, and thus the change in impedance of the measuring electrode 200 due to contact with a medium can be accurately calculated. For calibration, typically known calibration standards such as open, short and a 50Ω resistor are used as load. Calibration of the measurement sensor 200 can be done at the factory.

The phase difference measuring unit 170 on, is thus arranged for determining an amplitude-phase characteristic of the filling material 20 measured by the measuring probe 200, on the basis of the variable frequency of the first frequency signal 112. This can be done by means of the phase and amplitude difference between the first frequency signal 112, or the signal 132, and the mixed signal 142. The output signals of the phase difference measurement unit 170 are fed to an evaluation unit and/or control unit 180, which comprises a signal processing unit 185. This allows the results of the phase difference measuring unit 170 to be evaluated, e.g. displayed visually.

Figure 2:
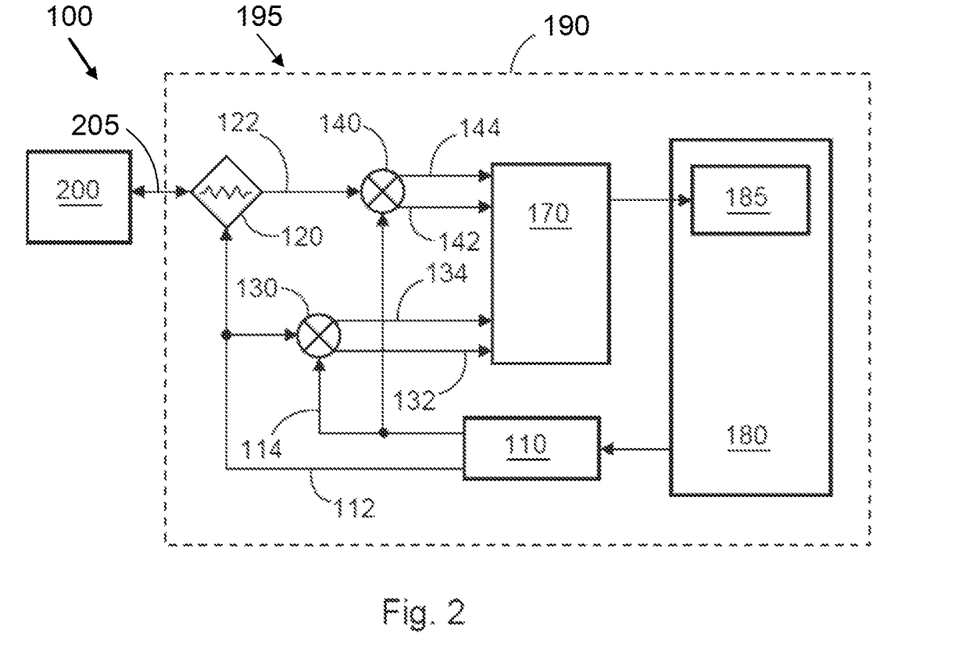
FIG. 2 schematically a level measuring device according to a further embodiment.

FIG. 2 schematically shows a level measuring device 100 according to a further embodiment. In contrast to FIG. 1, the reference mixer unit 130 and the receiver mixer unit 140 are designed as quadrature demodulators. The mixer unit 130 translates the measurement signal 112 into baseband and generates an in-phase component 132 and a quadrature component 134. Similarly, the receive signal 122 is translated into baseband by the mixer unit 140 and the in-phase component 142 and quadrature component 144 are generated. The in-phase components 132 and 142, and the quadrature components 134 and 144, are then digitized by a conversion unit 170. Converting the signals to baseband here offers the advantage that lower demands can be placed on the analog-to-digital converter. Subsequently, the magnitude and phase of the two signals 112 and 122 can be calculated by in-phase and quadrature components.

Figure 3:
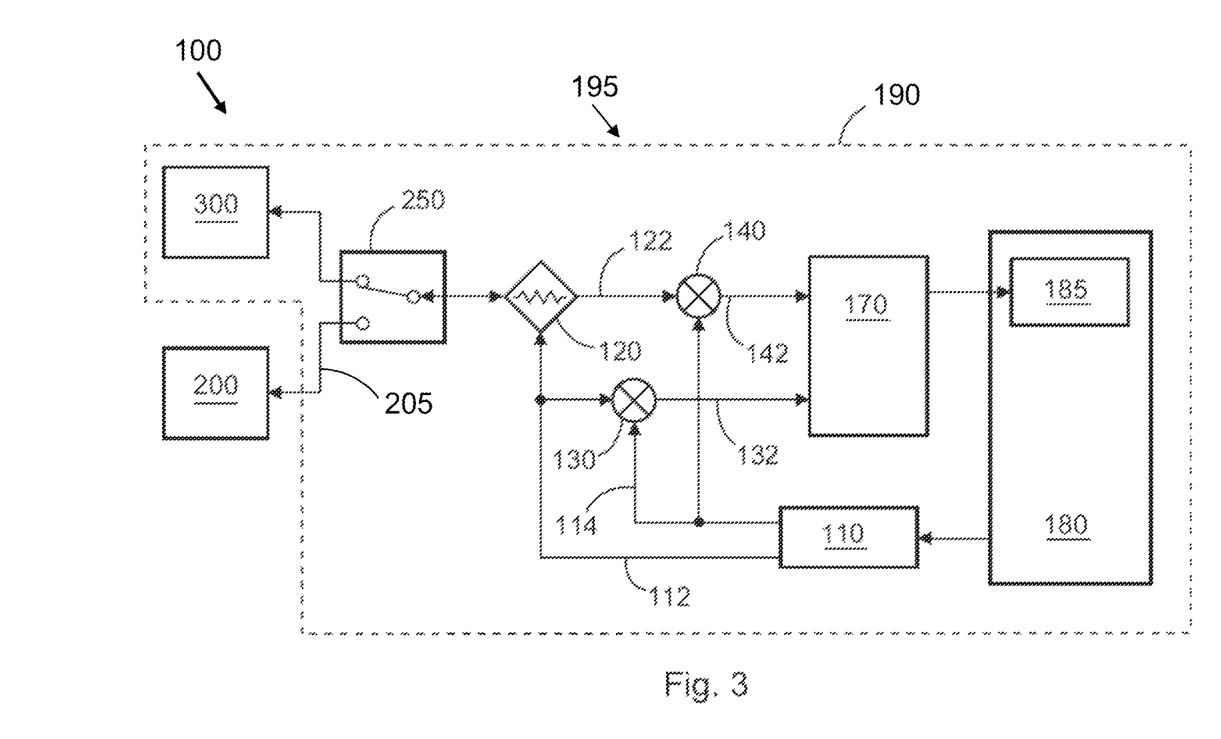
FIG. 3 schematically a level measuring device according to a further embodiment.

FIG. 3 schematically shows a level measuring device 100 according to a further embodiment form. This embodiment differs from the embodiment shown in FIG. 1 in that a first calibration unit 300 is connected in parallel with the measuring probe 200 to a changeover device 250. Thus, for calibration of the measuring probe 200 and/or further parts of the level meter 100, optionally an impedance of the first calibration unit 300 can be measured instead of the impedance of the filling material 20 measured by the measuring probe 200. For this purpose, a switch 250 is interposed between the measuring electrode 200 and the measuring bridge 120. This makes it possible to decouple the measuring electrode 200 from the measuring bridge 120 and to load the measuring bridge 120 with the first calibration unit 300 instead. This allows the sensor electronics unit 100 to be recalibrated during operation to compensate for any influences of environmental conditions, such as temperature influences. The basis for the measurement accuracy of the sensor can be a calibration performed, for example, at the factory on the surface of the measuring electrode 200, which is stored in a memory of the evaluation unit 180.

Figure 4:
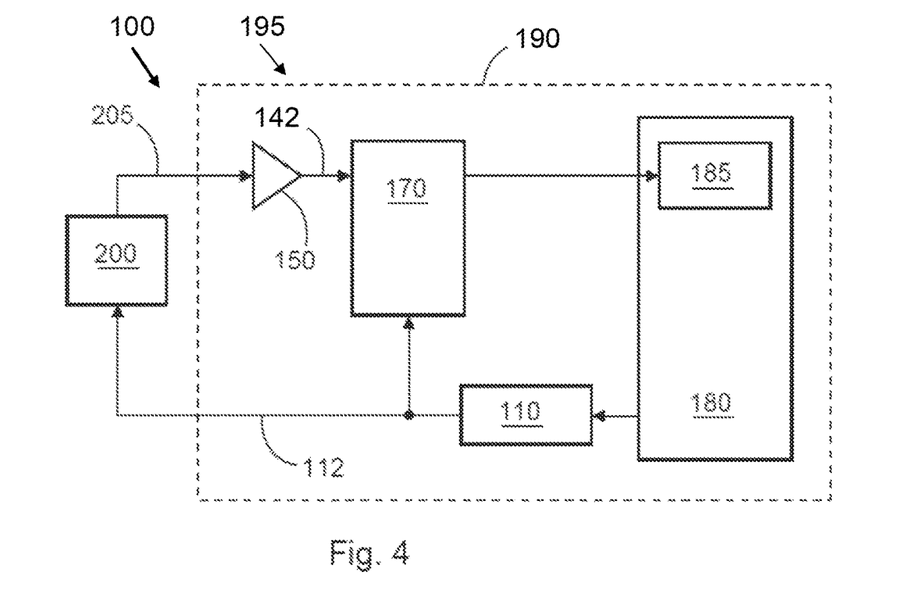
FIG. 4 schematically a level measuring device according to a further embodiment.

FIG. 4 schematically shows a level measuring device 100 according to a further embodiment form. Here, the measuring transducer 190 has a transimpedance amplifier 150, which is configured for connecting the measuring probe 200 and for outputting the mixed signal 142.

The same measuring signal 112 is used here as in FIG. 1, for example. On the one hand, the measuring signal 112 is digitized directly by the converter unit 170, and on the other hand, it is applied to the measuring probe 200. The signal 205 is a current signal representing the current flow through the measuring electrode 200. The impedance of the measuring probe 200 changes the magnitude and phase of the current signal 205. Therefore, the ratio of the voltage signal 112 and the current signal 205 represents the impedance of the measuring probe 200. For easier digitization by the conversion unit 170, the current signal 205 is converted to a proportional voltage signal 142 by a transimpedance amplifier 150. The signal processing unit 185 then calculates the complex impedance of the measuring probe 200. As in the other embodiments, it may be useful to calibrate the sensor electronics unit 100 together with the measuring electrode 200. It is therefore advantageous to provide an electronic switch 250 and a calibration unit 300 between the signal generation unit 110 and the measuring probe 200 for this method as well. Special ICs such as the chips AD5933 and AD5934 from the manufacturer Analog Devices Inc. already contain the modules 170, 185, 110 and 150, whereby a simpler realization of this method is possible with the aid of such a chip.

Figure 5A:
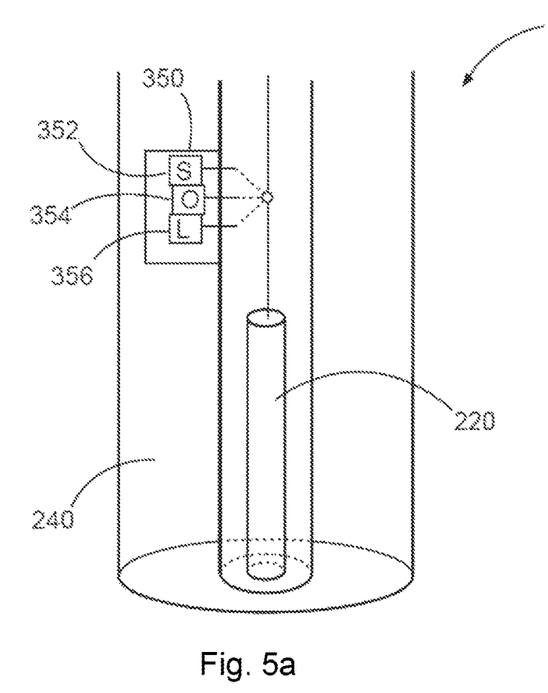
FIG. 5a schematically a measuring probe and/or measuring bridge according to an embodiment.

FIG. 5*a* schematically shows a measuring probe 200 according to an embodiment. The measuring probe 200 has a second calibration unit 350, which can be placed close to the measuring electrode 200 for a particularly favorable effect in order to keep parasitic effects low. The second calibration unit 350 has three calibration standards: a short-circuit standard S 352, an open standard O 354, and/or a load standard L 356.

This calibration data can be recorded and stored at the factory, so that the contribution of the measuring electrode 200 to the impedance measurement can be known. If it is assumed that temperature influences have only a minor effect on the impedance of the measuring electrode 200, recalibration can be carried out during operation by means of the second calibration unit 350 in order to compensate for the significantly stronger influences of the sensor electronics.

Figure 5B:
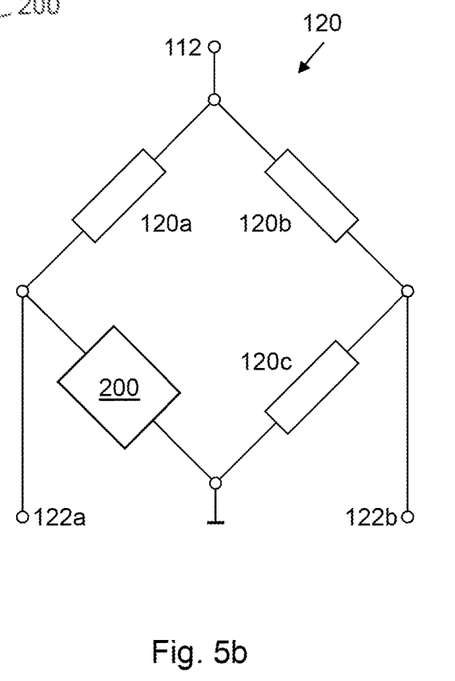
FIG. 5b schematically a measuring bridge according to an embodiment.

FIG. 5*b* schematically shows a measuring bridge 120 according to an embodiment. The embodiment is designed as a Wheatstone measuring bridge, with the measuring probe 200 replacing one of the resistors. The first frequency signal 112 is applied as an excitation signal to an input of the measuring bridge 120, so that the measuring probe 200 is acted upon by the first frequency signal 112. Furthermore, the measuring bridge 120 has bridge two measuring points 122*a*, 122*b* (which are designated by the reference sign 122 in FIGS. 1 to 3) at which the signals or the received signal 122 can be tapped. For example, the signal 122*a* can be directed to the receiving mixer unit 140 and the signal 122*b* can be directed to the reference mixer unit 130. Furthermore, a voltage difference of 122*a* and 122*b* can be converted from differential to single-ended via a differential amplifier, for example, and supplied to the receiving mixer unit 140. In this case, the excitation signal 112 is fed to the reference mixer unit 130. Furthermore, depending on the embodiment of the mixer, it is also possible to feed the differential signal 122 (i.e., signals 122*a* and 122*b*) to the input of 140. The embodiment of FIG. 5*b* is to be considered only as an example; other implementations of the measuring bridge 120 are also possible.

Figure 6:
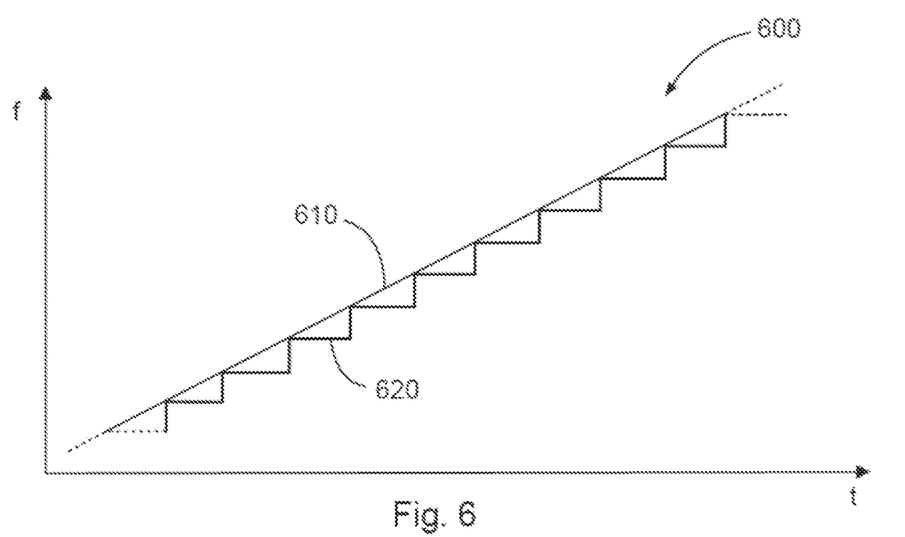
FIG. 6 a time-frequency diagram according to an embodiment.

FIG. 6 shows a time-frequency diagram 600 according to an embodiment. Here, a continuously varying frequency response 610 over time is shown. Furthermore, the diagram 600 shows a stepped linear or stepped variable frequency response 620. Other forms are also possible, such as non-linear responses.

FIG. 7 shows a polar diagram 700 with measurements and/or simulations according to an embodiment. The horizontal axis of the polar diagram 700 shows the real part (ohmic resistance), the vertical axis the imaginary part (capacitive or inductive resistance) of the impedance of the medium, material, filling material or product. Advantageously, a permittivity, e.g. a relative permittivity, of the medium can be detected. FIG. 7 shows a selection of four different measured media as well as the simulation curve of an equivalent circuit. Highly conductive media, such as the vinegar cleaner shown in a curve 710, have almost no imaginary component, since the electromagnetic field at the electrodes is almost short-circuited and thus hardly any field energy reaches the medium. Here, the real part of the impedance predominates, and the behavior resembles a low-impedance resistor. The medium glycerol (in curve 720) behaves differently, as it has only a very low conductivity but an average relative dielectric constant εr of about 13. Thus, enough reactive power is introduced into the medium to produce a measurable current flow. This behavior is similar to an ideal capacitor; the phase angle is approximately −90° in the entire frequency band.

The third medium shown in curve 730 is the impedance of water, where both resistive and capacitive components are visible. Pure water has a low conductivity but a high dielectric constant in the range of εr=80. The impedance curve of tap water in curve 730 could be simulated by means of an equivalent circuit consisting of the parallel connection of a capacitance of 16 pF and a resistance of 2400Ω, see curve 735. Curve 740 shows a curve of a medium with adhesion. This is skin cream, whose impedance curve 740 represents the covered state and curve 745 shows the change after the measuring probe has been withdrawn from the reservoir, i.e. in a non-covered state. In the case of a real level and/or limit level probe—e.g. because of the viscosity of the filling material skin cream—some of the filling material may still adhere to the sensor. If only the amount of impedance is measured, these adhesions can lead to a falsified or at least doubtful result, i.e. in at least some cases the status "not covered" is not clearly detected. When using the devices or measuring methods described here, a clear shift of the curve can be seen; i.e. after the medium only surrounds the measuring electrode in a thin adhesion, the behavior becomes more capacitive, i.e. the blind component or the contribution of the imaginary component increases, resulting in a curve 745 in the non-covered state, which can be clearly distinguished from the curve 740.

It is clear that the method described above and/or below can distinguish very well between a completely covered measuring electrode and buildup on the electrode. As a result, level switches can thus advantageously feature improved reliability and more versatile applicability. In addition to the use as level switch, the described method offers an applicability for media analysis and/or media monitoring.

Figure 8:
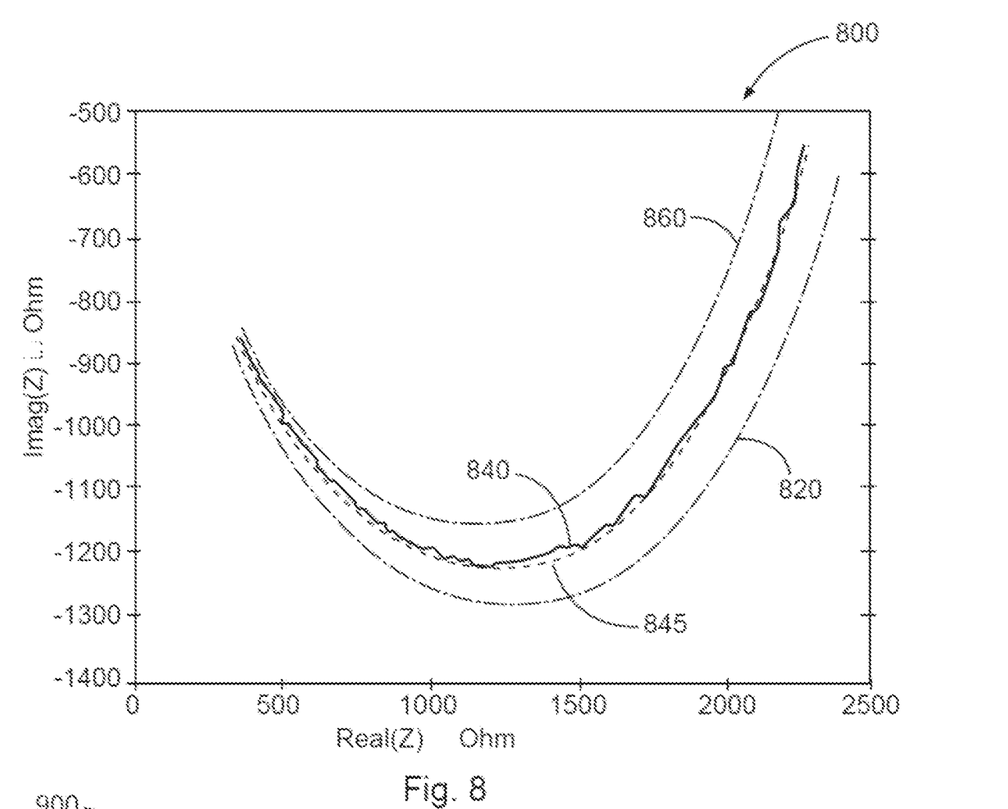
FIG. 8 several impedance curves measured by a level meter according to an embodiment.

FIG. 8 shows several impedance curves 800 measured by a level meter according to an embodiment. The measured impedance curve of tap water is shown in a measurement curve 840, and a simulated curve of the corresponding equivalent circuit is shown in a curve 845. If the conductivity of the water—which was determined to be 410 µs/cm in this measurement—is now to be monitored within a tolerance band of ±5%, for example, the limit curves can be derived directly from the equivalent circuit diagram. Curve 860 shows an increase in the real part of +5%, curve 820 correspondingly shows a reduction of −5%.

Here, the exact knowledge of the energy distribution between active and reactive power can be useful, as it results from the calculated equivalent circuit. A change in the capacitive component (εr-value) from the water would produce a completely different curve shape; therefore, a purely magnitude-based measurement or evaluation of the impedance would not reveal the real cause of the medium change. This is a significant advantage of the vectorial measurement, because the influences of the different components can be considered separately.

Figure 9:
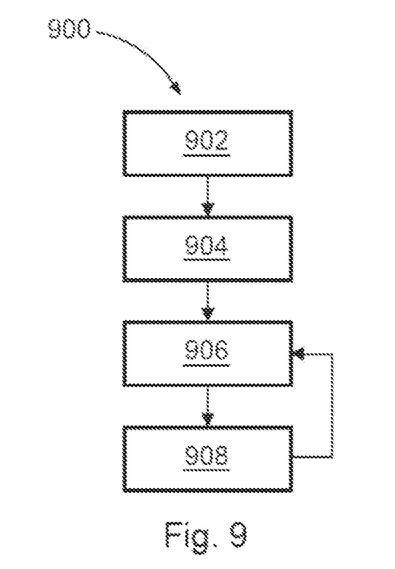
FIG. 9 a flowchart showing a process according to an embodiment.

FIG. 9 shows a flowchart 900 with a method for measuring an impedance of a filling material according to an embodiment. In a step 902, a measuring probe 200 (see FIG. 10) is arranged in a filling material 20 within a container 10. In a step 904, a level measuring device 100 is connected to the measuring probe 200. In a step 906, a first variable frequency signal 112 is applied to the measuring probe 200. In a step 908, an amplitude-phase response of the filling material 20 measured by the measuring probe 200 is determined by means of a phase and amplitude difference based on the variable frequency of the first frequency signal 112.

Figure 10:
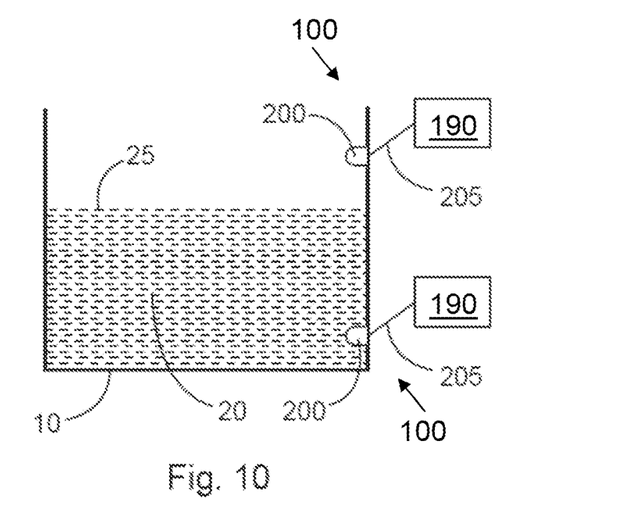
FIG. 10 a container with a level measuring device according to an embodiment.

FIG. 10 shows a container 10 with a level measuring device 100, comprising a device 190 and a measuring probe 200, according to an embodiment form. In the shown container 10, two level measuring devices 100 with measuring probes 200 are shown, e.g. for measuring a predefined upper and lower limit of a level 25 of a product, material, filling material or medium 20 in the container 10. Furthermore, an impedance of the filling material or medium 20 can also be determined with the level measuring device 100, as described above and/or below. Only one measuring probe 200 may also be arranged in the container 10, or several measuring probes 200 may be arranged in order to be able to detect other levels 25 and/or impedances.

LIST OF REFERENCE SIGNS

100 Level gauge
110 Signal generation unit
112 Frequency signal/measurement signal
114 Local oscillator signal
120 Measuring bridge
122, 122a, 122b Receiving signal
130 Reference mixing unit
132 Reference signal/Inphase component
134 Reference signal/quadrature component
136 Signal
140 Receiving mixer unit
142 Mixed signal/Inphase component
144 Mixed signal/quadrature component
146 Intermediate frequency signal
150 Transimpedance amplifier
170 Phase difference measuring unit/transducer unit
180 Evaluation unit/control unit
185 Signal processing unit
190 Measuring transducer
200 Measuring probe
205 Measuring signal
220 Measuring electrode
240 Sheath electrode
250 Switching device/switch
300 first calibration unit
350 Second calibration unit
352 Short circuit standard S
354 Open standard O
356 Load standard L
600 Diagram
610, 620 Frequency response
700 Polar diagram
710-745 Impedance curves
800 Impedance curves
820, 840, 845, 860 Curves
900 Flow diagram
902-908 steps

What is claimed is:

1. A level measuring device for level and/or limit determination and for measuring an impedance of a filling material in a container, comprising:
  a measuring probe configured to measure the impedance of the filling material, the measuring probe comprising:
    a sheath electrode; and
    a measuring electrode disposed at least partially within an outer contour of the sheath electrode;
  a signal generation unit configured to:
    generate a first variable frequency signal, wherein the measuring probe is supplied with the first variable frequency signal and outputs a measurement signal, and
    generate a second variable frequency signal, the second variable frequency signal having a constant frequency difference from the first variable frequency signal;
  a measurement converter configured to convert the measurement signal into a mixed signal, the mixed signal having a phase and amplitude difference from the first variable frequency signal;
  a transducer, comprising:

a reference mixing unit configured to mix the first variable frequency signal with the second variable frequency signal to produce a first reference signal; and a receive mixer unit configured to mix the second variable frequency signal with an output of a measuring bridge to produce the mixed signal, the measuring bridge being connected to the measuring probe; and a phase difference measuring unit configured to determine an amplitude-phase response of the material measured by the measuring probe, by means of the phase and amplitude difference between the first variable frequency signal and the mixed signal, based on the variable frequency of the first variable frequency signal.

2. The level measuring device according to claim 1, wherein the reference mixer unit and/or the receiving mixer unit is designed as a double-balanced mixer or as a quadrature demodulator.

3. The level measuring device according to claim 1, wherein the transducer comprises a transimpedance amplifier arranged configured to connect the measuring probe and to output the mixed signal.

4. The level measuring device according to claim 1, wherein the first variable frequency signal and the second variable frequency signal have a continuously varying frequency.

5. The level measuring device according to claim 1, wherein the first variable frequency signal and the second variable frequency signal have a stepwise variable frequency.

6. The level measuring device according to claim 1, further comprising:
a first calibration unit,
wherein the first calibration unit is connected in parallel to the measuring probe to a changeover device, so that an impedance of the first calibration unit is measured instead of the impedance of the filling material measured by the measuring probe.

7. The level measuring device according to claim 6, wherein the calibration unit comprises at least one of the following calibration standards:
a short circuit standard (S),
an open standard (O),
a load standard (L).

8. The level measuring device according to claim 1, wherein the first variable frequency signal and the second variable frequency signal have a frequency between 50 Hz and 500 kHz.

9. The level measuring device according to claim 1, wherein the first variable frequency signal and the second variable frequency signal have a constant frequency difference between 10 Hz and 50 KHz.

10. The level measuring device according to claim 1, further comprising:
an evaluation unit,
wherein the evaluation unit is configured to determine a type of the filling material.

11. The level measuring device according to claim 6, further comprising:
a second calibration unit,
wherein the second calibration unit is connected in parallel to the measuring probe, so that an impedance of the second calibration unit can optionally be measured by the level measuring device instead of the impedance of the filling material measured by the measuring probe.

12. A method of measuring an impedance of a filling material using the level measuring device according to claim 1, the method comprising:
arranging the measuring probe in a filling material within a container;
connecting the level measuring device to the measuring probe;
applying a first variable frequency signal to the measurement probe; and
determining an amplitude-phase of the filling material measured by the measuring probe, by means of a phase and amplitude difference based on the variable frequency of the first variable frequency signal.

13. A method of measuring an impedance of a filling material using the level measuring device according to claim 1, the method comprising:
arranging the measuring probe in a filling material within a container;
connecting the level measuring device to the measuring probe;
applying a first variable frequency signal to the measurement probe; and determining an amplitude-phase of the filling material measured by the measuring probe, by means of a phase and amplitude difference based on the variable frequency of the first variable frequency signal.

* * * * *